(12) United States Patent
Goerich et al.

(10) Patent No.: US 8,647,748 B2
(45) Date of Patent: Feb. 11, 2014

(54) THERMOPLASTIC PRODUCT AND METHOD FOR THE PRODUCTION OF A COMPOSITE PRODUCT

(75) Inventors: Gerald Goerich, Weiterstadt (DE); Sebastian Graf, Schwalbach (DE); Dagmar Koppler, Rothenburg o.d. Tauber (DE); Manuela Gehringer, Auernhofen (DE)

(73) Assignee: Braun GmbH, Kronberg (DE)

( * ) Notice: Subject to any disclaimer, the term of this patent is extended or adjusted under 35 U.S.C. 154(b) by 0 days.

(21) Appl. No.: 13/193,193

(22) Filed: Jul. 28, 2011

(65) Prior Publication Data
US 2011/0281128 A1 Nov. 17, 2011

Related U.S. Application Data

(63) Continuation of application No. 12/367,636, filed on Feb. 9, 2009, now abandoned, which is a continuation of application No. PCT/EP2007/006874, filed on Aug. 3, 2007.

(30) Foreign Application Priority Data

Aug. 10, 2006 (DE) .......................... 10 2006 037 534
Aug. 10, 2006 (DE) .......................... 10 2006 037 535

(51) Int. Cl.
*B32B 27/00* (2006.01)
*B32B 27/08* (2006.01)

(52) U.S. Cl.
USPC .......................................... 428/500; 428/515

(58) Field of Classification Search
None
See application file for complete search history.

(56) References Cited

U.S. PATENT DOCUMENTS

2004/0005473 A1* 1/2004 Matteucci et al. ............ 428/515
2004/0151933 A1 8/2004 Ajbani et al.

FOREIGN PATENT DOCUMENTS

EP 0 832 931 A 4/1998
EP 1 225 036 A 7/2002

OTHER PUBLICATIONS

European Search Report for PCT/EP2007/006874 dated Feb. 20, 2008.

* cited by examiner

*Primary Examiner* — Sheeba Ahmed
(74) *Attorney, Agent, or Firm* — Brent M. Peebles

(57) ABSTRACT

The disclosure relates to a composite thermoplastic product including a first polar engineering thermoplastic cohesively bound to a second thermoplastic that includes a styrene-based thermoplastic elastomer and a polyolefin. The first thermoplastic can contain a polar thermoplastic polymer cohesively bound to the second thermoplastic. Methods for the production of the composite product are also described, including methods for forming an adhesive bond between polar engineering thermoplastics such as ABS, ABS/PC, PC or PMMA and non-polar thermoplastic elastomers containing styrene elastomers, such as SEBS or SEPS, combined with a polyolefin polymer.

10 Claims, 4 Drawing Sheets

THERMOPLASTIC PRODUCT AND METHOD FOR THE PRODUCTION OF A COMPOSITE PRODUCT

CROSS REFERENCE

This application is a continuation application of U.S. application Ser. No. 12/367,636 filed Feb. 9, 2009, now abandoned which is a continuation of International PCT Application PCT/EP2007/006874, filed Aug. 3, 2007.

FIELD OF THE INVENTION

This disclosure relates to thermoplastic products and methods for producing composite products.

BACKGROUND OF THE INVENTION

Cohesive bonding with engineering thermoplastics such as ABS (acrylonitrile butadiene styrene copolymers), ABS/PC (acrylonitrile butadiene styrene copolymers/polycarbonate), PC (polycarbonate) and PMMA (polymethylmethacrylate) may be obtained by combining SEBS (polystyrene-poly(ethylene/butylene)-polystyrene) with polar thermoplastic elastomers such as TPE-E (thermoplastic polyester elastomers) or TPU (thermoplastic polyurethanes). Products of such kind are described for example in U.S. Pat. No. 5,149,589.

Thermoplastic elastomers containing SEBS/PP (polystyrene poly(ethylene/butylene) polystyrene/polypropylene) can exhibit outstanding cohesive bonding with polyolefinic substances such as polypropylene or a polyolefin. Even transparent materials with this composition are known. For example, Volume 1/2005, pages 34-36 of Kunststoffe includes an account to the effect that adhesion to PC, PMMA and MABS (methylmethacrylate acrylonitrile/butadiene styrene copolymers) is possible with materials containing S-SB-S (partially unsaturated styrene/butadiene block copolymer), which is sold under the brand name Styroflex®. This material has a hardness of 85 Shore A. This is considered to be too hard for many insulation applications, and it cannot be used in many outdoor applications because of the presence of double bonds.

Modifying SEBS with TPE-E or TPU and compatibilization using acid-modified SEBS or modified PP (polypropylene) can be expensive and difficult. In certain components, the multiphase construction can result in delamination in the area of the sprue gate. The materials must often be dried beforehand because they are blended with polar thermoplastic elastomers such as TPE-E or TPU that are prone to hydrolyzing. In addition, adhesion-modified materials according to the related art cannot be used as insulating materials at temperatures above 70° C.

Two fundamentally different methods are used in the related art to produce ornamental, partially electroplated parts or multicomponent parts with ornamental electroplating. In the first method, the hard plastic parts are injected, electroplated and extrusion coated with TPE. This method is used to manufacture side panels for electric shavers, for example. The disadvantage of this method is that it is expensive, because the tools and the process in general require extremely close tolerances. Moreover, the reject ratio associated with this method is not insignificant. Moreover, electroplating is a clearance-based process in which layer thicknesses are determined among other factors by the position on the electroplating jig. The variations in layer thicknesses inherent in the process must be controlled with sophisticated process guidance and monitoring systems. It is also considered a disadvantage that manual intervention is required in a high proportion of the various process steps. It is also disadvantageous that only a positive locking bond is created between the electroplated part and the soft plastic part, which means that no impermeability is created between the parts. If such a seal is necessary, it can only be produced with an even more complex equipment configuration and additional sealing elements. The second method takes into account a more complex part design, so that the number of process steps, as described in the first method, may be reduced and the equipment design may be simplified. Accordingly, the parts must be provided with a complicated sealing strip made from a non-electroplated plastic. This is necessary to prevent the electroplated layer from being damaged when the tool is closed. The disadvantage in this case is that a three-component injection molded part is needed, which entails greater investment.

There remains a need for methods of producing transparent polymer compounds with excellent cohesive bonding to amorphous engineering thermoplastics and good weathering properties, as well as a Shore hardness values below 70 Shore A. In addition, there remains a need for methods to electroplate hard/soft composite products selectively when standard commercial thermoplastic elastomers (TPEs) constitute the soft component.

SUMMARY OF THE INVENTION

Thermoplastic products are provided that include a first polar engineering thermoplastic cohesively bound to a second thermoplastic containing a styrene-based thermoplastic elastomer and a polyolefin. Surprisingly, the first polar engineering thermoplastic can be cohesively bound to the second thermoplastic, for example by using the methods disclosed herein. As a result, an adhesive bond can be formed between polar engineering thermoplastics such as ABS, ABS/PC, PC or PMMA and non-polar thermoplastic elastomers containing styrene elastomers combined with polyolefins. The thermoplastic products can include a composite comprising (or consisting essentially of) a first thermoplastic comprising (or consisting essentially of) a polar engineering thermoplastic such as ABS, ABS/PC and/or PMMA cohesively bound to a second thermoplastic comprising (or consisting essentially of) a polyolefin and a styrene-based thermoplastic elastomer such as polystyrene poly(ethylene/propylene) polystyrene (SEPS) and/or polystyrene poly(ethylene/butylene) polystyrene (SEBS).

Methods for producing a composite product are also provided. The methods can include providing an injection mold and injection molding the composite product in the injection mold. The composite product can include a hard plastic part and a soft plastic part. The hard plastic part can comprise (or consist essentially of) a polar amorphous engineering thermoplastic material (e.g., ABS, ABS/PC, PMMA). The soft plastic part can comprise (or consist essentially of) a styrene-based elastomer (e.g. SEBS or SEPS) and a polyolefin. The styrene-based elastomer can have a crystalline portion of not more than 20% by weight of the elastomer. For example, the soft plastic part can comprise (or consist essentially of) a polystyrene poly(ethylene/butylene) polystyrene that has a side chain fraction of more than 60%.

The method can further include one or more of the following: selectively electroplating the composite product, overmolding the hard plastic part with a thermoplastic made from the styrene-based elastomer and the polyolefin, performing one or more reject inspection(s) (e.g., after the injection and the selective electroplating), incorporating metallic effect spangles in the composite product, hardening the composite product and/or applying printing to the composite product.

DETAILED DESCRIPTION OF THE INVENTION

Figure 1:
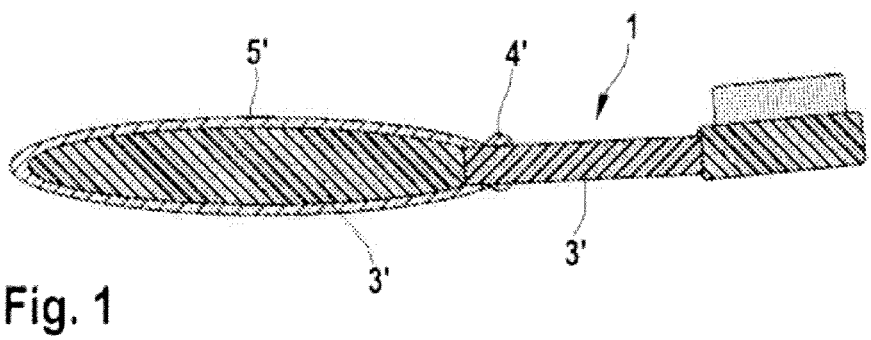
FIG. 1 shows a toothbrush 1 manufactured as a composite product.

A thermoplastic product is provided that includes a first polar engineering thermoplastic with cohesive bonding to a second thermoplastic, which includes a styrene-based thermoplastic elastomer and a polyolefin. In some examples of the product, the crystalline portion of the styrene-based thermoplastic elastomer can constitute not more than 20% by weight of the elastomer. The thermoplastic product can include an adhesive bond between polar engineering thermoplastics such as ABS, ABS/PC, PC or PMMA and non-polar thermoplastic elastomers containing styrene elastomers combined with polyolefins.

A low crystalline fraction (e.g., no more than 20%) in the styrene-based thermoplastic elastomer may be achieved by selecting appropriate, commercially available styrene elastomers of the SEBS group with a high side chain portion (e.g., more than 60%). Suitable commercial products are for example Kraton® MD 6932, Kraton® MD 6924 or Kraton® RP 6945. Another option in this context consists in the selection of SEPS (polystyrene poly(ethylene/propylene) polystyrene), which also has an amorphous soft segment due to its molecular structure. Such products are sold commercially under the trade name Septon®. Moreover, crystallization of the soft segment of standard SEBS types such as Kraton® G1651, or of SEEPS (polystyrene poly(ethylene/ethylene/propylene) polystyrene), which are sold for example under the name Septon® 4055, may be prevented by α-olefins, which are sold for example under the trade name Engage®, or by atactic polypropylenes, which are sold for example under the trade name Rextac®. Other polyolefins selected from the group of homo- or copolymers, particularly PP (polypropylene) and PE (polyethylene) may be added to the second thermoplastic in an amount of up to 70%. Additionally, a polyolefin modified with maleic acid anhydride, or special styrene elastomers, such as those sold under the trade names Orevac® CA 100 or Kraton® FG 1901, may be added to the second thermoplastic. Softeners from the group of paraffinic or engineering oils may also be added in quantities of up to 60% by weight of the second thermoplastic. The second thermoplastic may contain usual commercial fillers and/or reinforcing agents such as calcium carbonate, talc, barium sulphate, metal oxides, hydroxides or silicic acid in quantities of up to 80% by weight. Standard additives such as antioxidants, light stabilisers, lubricants or colorants may also be added.

The thermoplastic product can be characterized in that it includes a first polar engineering thermoplastic with cohesive bonding to a second thermoplastic, which includes a styrene-based thermoplastic elastomer and a polyolefin. The crystalline portion of the styrene-based thermoplastic elastomer can constitute not more than 20% by weight of the elastomer. For example, the second thermoplastic can include one or more of the following: (a) a SEBS in which the side chain represents a fraction of more than 60%, (b) a SEPS with amorphous soft segments, (c) atactic polypropylene and/or α-olefins, (d) a polyolefin selected from the group consisting of homopolymers or copolymers (e.g., polyolefin can be a homopolymer or copolymer of polyethylene or polypropylene), (e) an acid-modified polypropylene or an acid-modified styrene-based thermoplastic elastomer, (f) softeners from the group consisting of paraffinic or engineering oils in quantities of up 60% by weight of the second thermoplastic, (g) fillers and/or reinforcing agents, (h) calcium carbonate, talc, barium sulphate, metal oxides, metal hydroxides or silicic acid (e.g., in quantities up to 80% by weight of the second thermoplastic) and (i) antioxidants, light stabilizers, lubricants or coloring agents. The first thermoplastic can be an amorphous thermoplastic. The thermoplastic product can be characterized in that it is able to be injection molded, extruded or calendered.

This disclosure further relates methods for producing a composite product. These methods can include injection molding a composite product, and selective electroplating. By following methods described herein, it is possible to create an adhesive bond between polar engineering thermoplastics such as ABS, ABS/PC, PC or PMMA and non-polar thermoplastic elastomers containing styrene elastomers combined with polyolefins. For example, a method of producing a composite product can include selective electroplating from a hard plastic part and a soft plastic part. A thermoplastic including a styrene-based elastomer and a polyolefin can be used to produce the soft plastic part. The method can include the steps of a) creating an injection mold for the composite product, b) injecting the composite product, and c) selectively electroplating the composite product. The method can also include reject inspection steps carried out as additional process steps (e.g., after the injection and electroplating). The thermoplastic made from styrene-based elastomer and polyolefin can be used to produce the soft plastic part.

In order to illustrate particular advantages of one method disclosed herein (e.g., Method 1 in Table 1 below), Method 1 is contrasted with a description of another method (e.g., Method 2 in Table 1 below) with reference to the Table 1 below. Method 2 includes separate steps for creating an injection mold for the hard plastic part and the soft plastic part, instead of injection molding of a composite product (e.g., as shown in Method 1).

TABLE 1

| Method 1 | Method 2 |
|---|---|
| Creation of an injection mold for the composite product | Creation of an injection mold for the hard plastic part |
| ↓ | ↓ |
|  | Creation of an injection mold for the soft plastic part |
|  | ↓ |
| Injection molding of the composite product | Injection molding of the hard plastic part |
| ↓ | ↓ |
| Reject inspection of the composite product | Reject inspection of the hard plastic part |
| ↓ | ↓ |
| Selective electroplating of the composite product | Electroplating of the hard plastic part |
| ↓ | ↓ |
| Reject inspection of the electroplated composite product | Reject inspection of the electroplated hard plastic part |
|  | ↓ |
|  | Insertion of the hard plastic part according to cavity |
|  | ↓ |
|  | Inection molding of the soft plastic part |
|  | ↓ |
|  | Reject inspection of the electroplated composite product |

Referring to Table 1, apart from being several steps shorter than Method 2, Method 1 has a further advantage over Method 2 in that the individual parts are not joined mechanically by cohesive bonding. This may also involve several hard plastic parts on the one hand and several soft plastic parts on the other. With the use of the thermoplastic made from styrene-based elastomer and polyolefin, including Method 1 in Table 1, it is possible to electroplate the hard plastic part or parts because the thermoplastic is resistant to chromic-sulphuric acid. The composite product may thus be manufactured and subsequently electroplated in a process that is very similar to the standard process.

The styrene-based thermoplastic elastomer (e.g., in the soft plastic part of the composite) can be a polystyrene poly(ethylene/butylene) polystyrene (SEBS) that has a side chain fraction of more than 60%. This results in a high amorphous fraction in the soft segment of the thermoplastic. Thermoplastics of such kind are sold under the trade names Kraton® MD 6932, Kraton® RP 6924 or Septon® 2063 in combination with polypropylene. The second thermoplastic (e.g., the soft plastic part of the composite) can also include a polyolefin. Normal softeners and fillers may be added to the second thermoplastic for production of the soft plastic part. The crystalline fraction of the thermoplastic of styrene-based elastomer used to produce the soft plastic part preferably makes up no more than 20% by weight of the elastomer.

A polar amorphous engineering thermoplastic is preferably used as the hard plastic part of the composite. Of these, an acrylonitrile butadiene styrene copolymer (ABS) or ABS blend is particularly suitable. These lend themselves well to electroplating. The best electroplating methods for ABS are the classic methods with chromic-sulphuric acid, and also ionogenic as well as colloidal methods. Concerning plastic metallization, the reader is referred to the Handbuch Kunststoff-Metallisierung [Plastic Metallization Manual], Leuze Verlag, Saulgau/Württemberg, 1991.

Methods for producing a composite product with selective electroplating from a hard plastic part and a soft plastic part can be characterized in that a thermoplastic including a styrene-based elastomer and a polyolefin is used to produce the soft plastic part. The methods can also include one or more of the following: (a) creating an injection mold for the composite product, (b) injecting the composite product and (c) selectively electroplating the composite product. The methods can be characterized in that one or more reject inspection(s) can be carried out as additional process steps after the injection and electroplating. The hard plastic part can be overmolded with the thermoplastic made from styrene-based elastomer and polyolefin. The methods can further be characterized by and/or comprise one or more of the following: (1) the thermoplastic is made from styrene-based elastomer and polyolefin and can be colored with metallic effect spangles, (2) printing is applied to the hard plastic part, (3) a polar amorphous engineering thermoplastic is used as the hard plastic, (4) an acrylonitrile butadiene styrene copolymer is used as the hard plastic, (5) the thermoplastic made from styrene-based elastomer has a crystalline portion of not more than 20% by weight of the elastomer, and (5) a polystyrene poly(ethylene/butylene) polystyrene that has a side chain fraction of more than 60% is used to produce the soft plastic part. The hard plastic part can be overmolded in the thermoplastic made from styrene-based elastomer and polyolefin. Printing can be applied to the hard plastic part. The transparency of the hard and soft plastic parts can also be combined with special light effects to offer a range of possibilities for designers.

Yet another preferred method is one that is characterized in that the thermoplastic of styrene-based elastomer and polyolefin is colored with metal effect spangles. Particularly striking effects may be achieved by coloring the hard plastic part, which is capable of being electroplated, and overmolding it with the soft plastic part that is not electroplated. The substrate color can then only be visible in the area covered by the transparent soft material. Special effects may also be created if the transparent soft plastic part is colored with metallic effect spangles and has a colored background to give the effect of depth, or a part of the area to be overmolded is decorated, for example by printing. With this process, it is also possible to keep areas of the molded part's surface free of metallic coating by designing the geometry of the soft plastic part to shield the surface line in the electroplating bath, thereby creating even more color effects.

Areas of application for the composite products manufactured with the methods described herein include, for example, shavers, plating jig protectors, packaging or small bottles.

EXAMPLES

In the following text, examples of thermoplastic products will be explained in greater detail with reference to a number of examples.

Example 1

A polymer compound is produced in the normal way from 30.3% by weight SEBS having a side chain fraction of more than 60% (Kraton® RP 6924), 24.2% by weight paraffinic white oil (Primol 382), 3.0% by weight homopolypropylene (Borealis HD 120 MO), 18.2% by weight copolymerized polypropylene (Hifax® CA 60A) and 24.3% by weight CaO3 (Calcilit 6G).

Example 2

A polymer compound is produced in the normal way from 84.7% by weight SEBS having a side chain fraction of more than 60% (Kraton® MD 6932) and 15.3% by weight PP-MAH (polypropylene maleic acid anhydride) (Orevac® CA 100).

Example 3

A polymer compound is produced in the normal way from 66.7% by weight SEPS (Septon® 2063), 16.7% by weight copolymerized polypropylene (Hifax® CA 60A) and 16.6% by weight atactic polypropylene (Rextac® APAO 3585).

Comparison Example 1

A polymer compound is produced in the normal way from 19.2% by weight SEBS (Kraton® G1654), 5.8% by weight SEBS-MAH (Kraton® FG 1901), 23.1% by weight paraffinic white oil (Primol 382), 32.7% by weight TPE-E (Hytrel 4068) and 19.2% by weight $CaCO_3$ (Calcilit 6G).

Comparison Example 2

One hundred (100) percent S-SB-S (Styroflex® 2G 66) is used. The polymer compounds of the examples and comparison examples are homogenised on a twin screws compounding extruder (Berstorff ZE 50 A), and two-component composite body is produced on the Klöckner-Ferromatik F 110 injection molding machine. For this, the surfaces of ABS discs (Polylac 717) with dimensions of 150 mm·100 mm·2 mm are overmolded with 2 mm of the mixtures from the examples. The peeling forces for the mixtures from all examples are then tested comparatively on 200 mm wide strips, with an peel angle of 90° and test speeds of 100 mm/min on a Zwick 1445 tensile strength test machine. The averages of the peeling forces are shown in Table 2, together with the hardness of the respective mixtures.

TABLE 2

|  | Example 1 | Example 2 | Example 3 | Comparison example 1 | Comparison example 2 |
|---|---|---|---|---|---|
| Hardness | 55 Shore A | 55 Shore A | 55 Shore A | 56 Shore A | 84 Shore A |
| Adhesion to ABS | 32 MPa | 37 MPa | 46 MPa | 29 MPa | 69 Pa |

The thermoplastic product can exhibit significantly stronger material-based cohesive bonding than corresponding products of the related art. As a result, the thermoplastic product may be used, for example, as a seal against aqueous media. The thermoplastic product can have a further advantage over the related art in that it can also be transparent, thereby offering designers previously unknown possibilities. Another important advantage of the thermoplastic products can be that they provide good cohesive bonding even with Shore hardnesses of 50 Shore A and below.

Examples of the methods for producing a composite product with selective electroplating and the advantages that have been described thereof will be explained in greater detail in the following with reference to the Figures.

FIG. 1 shows a toothbrush 1 manufactured as a composite product in accordance with Method 1 discussed with respect to Table 1. Toothbrush 1 has a handle and a brush head. These two elements are connected by a brush neck. Together, they represent hard plastic part 3'. Hard plastic part 3' may be transparent to colored. The handle is encased with electroplating layer 5'. The handle is separated visibly from the brush neck by soft plastic part 4', which serves as an insulator. In a two-component injection molded application, this lends the appearance of three components.

Figure 2:
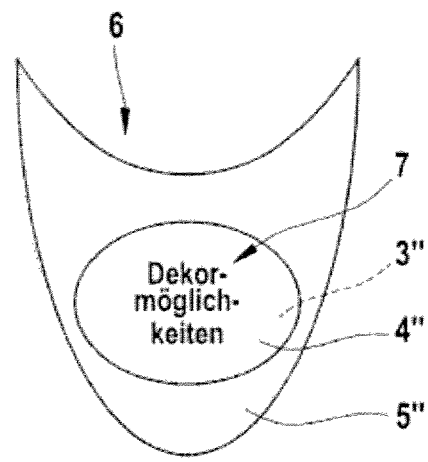
FIG. 2 shows a plan view of an ornamental composite product 6.
Figure 3:
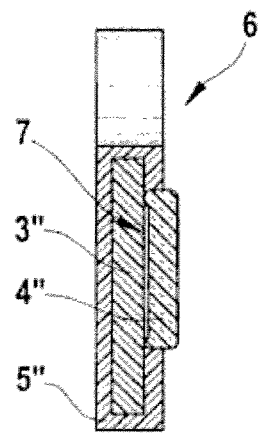
FIG. 3 shows a side view of ornamental composite product 6 of FIG. 2.

FIG. 2 shows a plan view of an ornamental composite product 6. An imprint or embossment 7 is applied to decorative product 6, which has a colored support as hard plastic part 3". Imprint or embossment 7 are overmolded with transparent soft plastic part 4". The area of hard plastic part 3" that is not overmolded is covered by electroplating layer 5". FIG. 3 shows a side view of ornamental composite product 6 of FIG. 2.

Figure 4:
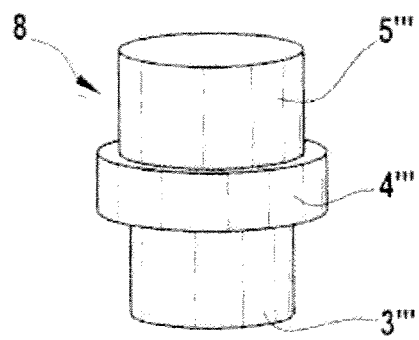
FIG. 4 shows an inclined view of a screw cap or lid 8.
Figure 5:
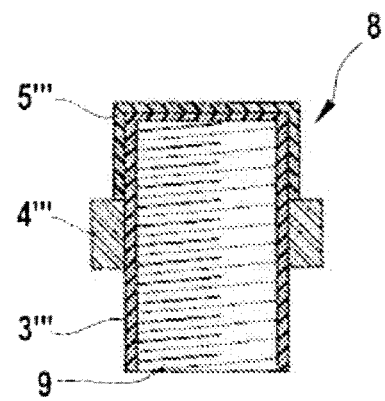
FIG. 5 shows a side view of the screw cap or lid 8 of FIG. 4.

FIG. 4 shows an inclined view of a screw cap or lid 8. In this case, an annular soft plastic part 4' encircles the screw cap or lid 8 roughly in the middle thereof. Soft plastic part 4' is transparent to colored and has an insulating effect. Hard plastic part 3''' serves as the base material and is colored. Electroplating layer 5''' is applied to hard plastic part 3''', except in the area occupied by annular soft plastic part 4'''. Screw cap or lid 8 is a two-component injection molded product that has the appearance of a three-component item. FIG. 5 shows a side view of the screw cap or lid 8 of FIG. 4. A thread 9 is shown for the alternative.

Figure 6:
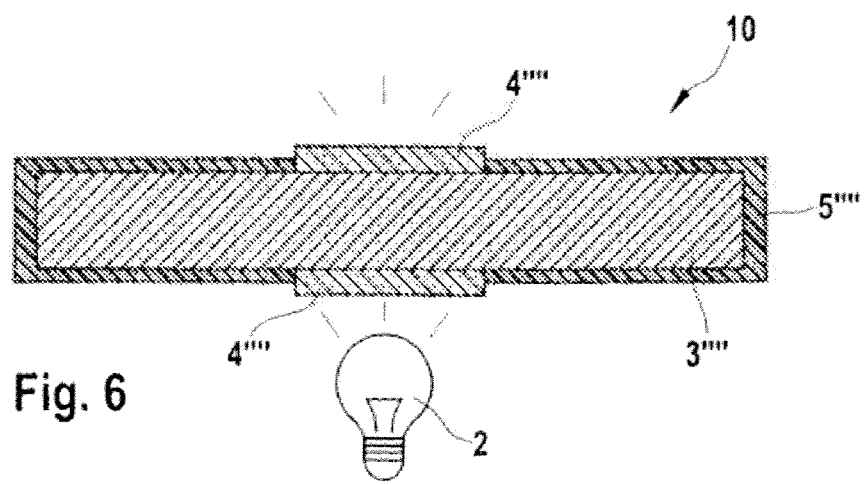
FIG. 6 shows side view of a switch or display 10.

FIG. 6 shows side view of a switch or display 10. In this case, hard plastic part 3"" serves as the transparent support material. The middle of both the upper side and the lower side of this part is overmolded with transparent soft plastic part 4"". The rest of the surface of hard plastic part 3"" is covered with electroplating layer 5"". A lighting means 2 is located below switch or display 10. The transparency of both hard plastic part 3"" and soft plastic part 4"" thus enable particularly striking optical effects to be created on the upper side of switch or display 10.

What is claimed is:
1. A thermoplastic product, comprising: a first polar engineering thermoplastic cohesively bound to a second thermoplastic including a styrene-containing thermoplastic elastomer and a polyolefin; wherein the crystalline portion of the styrene-containing thermoplastic elastomer constitutes not more than 20% by weight of the styrene-containing thermoplastic elastomer.

2. The thermoplastic product of claim 1, wherein the first polar engineering thermoplastic comprises a material selected from the group consisting of: ABS (acrylonitrile butadiene styrene copolymers), ABS/PC (acrylonitrile butadiene styrene copolymers/polycarbonate), PC (polycarbonate) and PMMA (polymethylmethacrylate).

3. The thermoplastic product of claim 1, wherein the second thermoplastic comprises a material selected from the group consisting of: SEBS (polystyrene poly(ethylene/butylene) polystyrene) and SEPS (polystyrene poly(ethylene/propylene) polystyrene).

4. The thermoplastic product of claim 1, wherein the second thermoplastic comprises a SEBS (polystyrene poly(ethylene/butylene) polystyrene) in which the side chain represents a fraction of more than 60%.

5. The thermoplastic product of claim 1, wherein the second thermoplastic comprises a material selected from the group consisting of: an acid-modified polypropylene and an acid-modified styrene-containing thermoplastic elastomer.

6. The thermoplastic product of claim 1, wherein the polyolefin comprises a polymer selected from the group consisting of: an atactic polypropylene and an α-olefin.

7. The thermoplastic product of claim 1, wherein the polyolefin comprises a polymer selected from the group consisting of: a homopolymer of polyethylene, a copolymer of polyethylene, a homopolymer of polypropylene and a copolymer of polypropylene.

8. The thermoplastic product of claim 1, wherein the second thermoplastic is cohesively bound to the first polar engineering thermoplastic with peeling force of at least about 32 MPa.

9. The thermoplastic product of claim 1, further comprising an electroplating layer contacting the first polar engineering thermoplastic.

10. The thermoplastic product of claim 1, wherein
  a. the first polar engineering thermoplastic comprises a material selected from the group consisting of: ABS (acrylonitrile butadiene styrene copolymers), ABS/PC (acrylonitrile butadiene styrene copolymers/polycarbonate), PC (polycarbonate) and PMMA (polymethylmethacrylate);
  b. the styrene-containing thermoplastic elastomer comprises a SEBS (polystyrene poly(ethylene/butylene) polystyrene) in which the side chain represents a fraction of more than 60%; and the styrene-containing thermoplastic elastomer has a crystalline portion that constitutes not more than 20% by weight of the styrene-containing thermoplastic elastomer; and
  c. the polyolefin comprises a polymer selected from the group consisting of: an atactic polypropylene, an α-olefin and an acid-modified polypropylene; and
  d. the thermoplastic product further comprises a material selected from the group consisting of: calcium carbonate, talc, barium sulphate, metal oxides, metal hydroxides, and silicic acid.

* * * * *